H. CÔTÉ & R. C. SNOW.
PICKER STICK.
APPLICATION FILED OCT. 2, 1908.
919,541.
Patented Apr. 27, 1909.
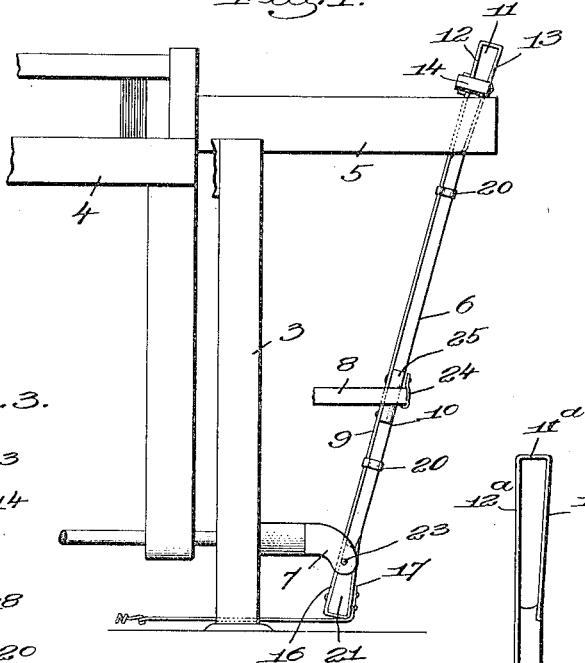
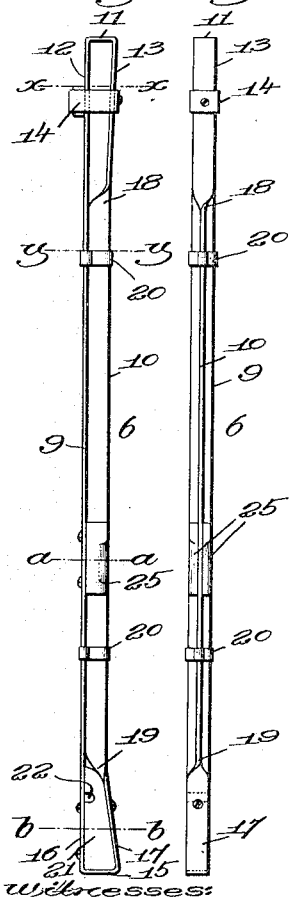
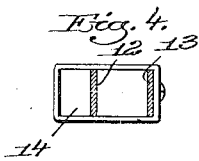
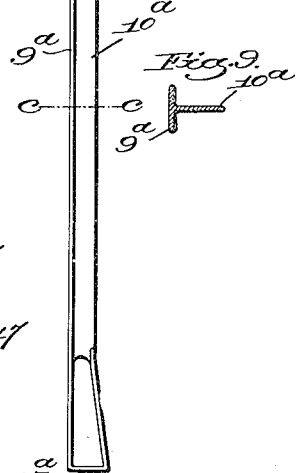
Witnesses:
Fred S. Greenleaf.
Joseph M. Ward.
Inventors,
Henry Côté
Rensselaer C. Snow,
by Kenly & Gregory Attys.

UNITED STATES PATENT OFFICE.

HENRY CÔTÉ, OF WEST WARREN, AND RENCELER C. SNOW, OF WARE, MASSACHUSETTS.

PICKER-STICK.

No. 919,541.  Specification of Letters Patent.  Patented April 27, 1909.

Application filed October 2, 1908. Serial No. 455,922.

*To all whom it may concern:*

Be it known that we, HENRY CÔTÉ, a citizen of the United States, residing at West Warren, county of Worcester, State of Massachusetts, and RENCELER C. SNOW, a citizen of the United States, residing at Ware, county of Hampshire, and State of Massachusetts, have invented an Improvement in Picker-Sticks, of which the following description, in connection with the accompanying drawing, is a specification, like characters on the drawing representing like parts.

This invention relates to picker sticks and has for its object to provide a metal picker stick which will be light in weight and which will have sufficient strength to withstand any strain to which it may be put.

The novel features of the invention will be more fully hereinafter described and then pointed out in the appended claims.

In the drawings Figure 1 is a view of one end of a loom showing our improved picker stick; Fig. 2 is a side view of the picker stick; Fig. 3 is a front view thereof; Fig. 4 is an enlarged section on the line x—x, Fig. 2; Fig. 5 is an enlarged section on the line y—y, Fig. 2; Fig. 6 is an enlarged section on the line a—a, Fig. 2; Fig. 7 is an enlarged section on the line b—b, Fig. 2; Fig. 8 is a view of a cast metal picker stick embodying our invention; Fig. 9 is an enlarged section on the line c—c, Fig. 8.

Referring to Fig. 1, 3 is a portion of the loom frame, 4 is the lay, 5 the shuttle box, 6 the picker stick which is pivoted to the arm or bracket 7, and 8 is the lug strap which embraces the picker stick and which transmits the picking motion thereto from the picking cam.

Picker sticks are now commonly made of wood instead of metal, partly because a wooden picker stick is lighter than a metal stick of the same proportions, and partly because the wooden picker stick has certain necessary resilient qualities which would be lacking in a metal picker stick of the same shape. We have, however, designed a metal picker stick, the weight of which is not appreciably greater than that of a wooden picker stick and which has the necessary resilient qualities required in a picker stick. Our picker stick is also of much greater strength than the ordinary picker stick and is, therefore, capable of out-wearing a wooden picker stick.

In order to make a picker stick which is light of weight and yet has sufficient strength, we provide the body of the picker stick with a strengthening rib or flange which extends longitudinally thereof and the depth of which is in a direction parallel to that in which the resistance of the shuttle is applied to the picker stick. The necessary resilient qualities of the picker stick are provided for by making the upper end of the picker stick in the form of two separated and more or less resilient arms which are adapted to receive the picker.

The picker stick may be made of a piece of wrought iron bent to the proper shape or may be made in the form of a casting. When it is made of wrought iron, we propose to use a piece of strap iron of approximately twice the length of the completed picker stick and to form the picker stick by doubling the strap iron on itself and welding or otherwise connecting the two ends together and then twisting one of the sides of the doubled strap iron so as to cause it to stand at right angles to the other side. This gives the body of the picker stick either a T-shape or an L-shape in cross section. Such a picker stick is shown in Figs. 1–7 inclusive, and it is formed from a piece of strap iron which is bent on itself to form the two sides 9 and 10. The side 9 is substantially straight throughout its length and the side 10 stands at right angles to the side 9, as clearly shown in Figs. 2, 3, 5 and 6, and may conveniently be situated centrally of said side 9 thereby giving the body of the picker stick a T-shape in cross section. This is not essential, however, as the side 10 might stand at one edge of the side 9, the essential feature being that it stand at right angles to said side 9. The upper end of the two sides 9 and 10 is connected by a looped portion 11, one side 12 of which may be a continuation of the side 9, and the other side 13 of which may be a continuation of the side 10. The two sides 12 and 13 of the loop stand one behind the other in the direction in which the picker moves and in the direction in which the blow from the picker is delivered to the shuttle. Said two sides or arms 12 and 13 constitute the portion of the picker stick which receives the picker and owing to their construction and position they make a properly resilient picker-receiving portion of the picker stick. The picker 14 may be of any suitable or usual construction and may be secured to the upper end of the picker stick in any convenient way. The two sides 9 and 10 are connected at their lower end by a looped portion 15, the two sides 16 and 17 of which are preferably parallel with each other and are continuations of the sides 9 and 10 of the body of the picker stick. In making a picker stick of this shape the piece of strap iron from which it is made is doubled on itself to form the two loops 15 and 11 and the ends of the pieces of strap iron are then welded or otherwise connected together. Thereafter one of the sides, for instance the side 10, is twisted to stand at right angles with the side 9, the twist in said side taking place at the points 18 and 19, thereby forming the two closed loops 11 and 15. If desired bands 20 may be placed around the two sides 9 and 10 to hold them in their proper position.

The loop 15 has preferably placed therein a wooden block 21 which is provided with the groove or aperture 22 to receive the pivotal pin 23 on which the picker is pivoted to the bracket 7. The upper loop 11 receives the picker as above described. The loop 24 for the reception of the lug strap 8 may be secured to the picker stick in any suitable way. We have shown, however, said picker stick as provided with two filling pieces 25 which are situated either side of the web 10 and which form a support to which the loop 24 may be secured in usual way. A picker stick made in this way is not appreciably heavier than a wooden picker stick, but is much stronger because of the relative positions of the sides 9 and 10, the side 10 constituting a stiffening rib or web which runs longitudinally of the body of the picker stick. The two sides 12 and 13 of the loop 11 which are embraced by the picker are sufficiently resilient so that when the picker strikes the shuttle the side 12 will yield and thus give to the picker stick the necessary resiliency. Instead of making the picker stick of wrought iron in this manner, we may make it of cast metal, preferably of cast steel, as shown in Figs. 8 and 9. A picker stick of this construction is made with the body 9ª which has cast integral therewith the stiffening web 10ª that runs longitudinally thereof and stands at right angles thereto. At the lower end the picker stick is formed with the looped portion 15ª into which a wooden block similar to the block 21 is inserted for furnishing a bearing for the picker stick on the pivotal pin 23. At the upper end the picker stick is cast with the loop 11ª having the two sides 12ª and 13ª, said loop 11ª constituting the picker-receiving portion of the picker stick. By making the upper end of the picker stick in this way it will have the necessary resilient qualities, but will at the same time be strengthened at the point where most strength is needed, without, however, giving to it an excessive weight.

Having fully described our invention, what we claim as new and desire to secure by Letters Patent is:—

1. A picker stick having a metal body provided with a picker-receiving portion which forms an integral part thereof and which is resilient in the direction in which the picker stick strikes its blow.

2. A picker stick having a metal body provided with a stiffening rib extending longitudinally thereof and provided at its upper end with a looped picker-receiving portion.

3. A picker stick having a metal body T-shape in cross section and having as an integral part thereof a resilient picker-receiving portion at its upper end.

4. A picker stick having a metal body T-shape in cross section and having at its upper end a looped portion to receive the picker.

5. A metal picker stick having a strengthening rib extending longitudinally thereof and provided at its lower end with a loop and a wooden block inserted in said loop and provided with a bearing for the pivotal pin of the picker stick.

In testimony whereof, we have signed our names to this specification, in the presence of two subscribing witnesses.

HENRY CÔTÉ.
RENCELER C. SNOW.

Witnesses:
LOUIS C. SMITH,
THOMAS J. DRUMMOND.